US008347272B2

(12) United States Patent
Sugawara et al.

(10) Patent No.: US 8,347,272 B2
(45) Date of Patent: Jan. 1, 2013

(54) CALL GRAPH DEPENDENCY EXTRACTION BY STATIC SOURCE CODE ANALYSIS

(75) Inventors: Naoki Sugawara, Yokohama (JP); Tadashi Yamamoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 12/177,909

(22) Filed: Jul. 23, 2008

(65) Prior Publication Data

US 2010/0023926 A1   Jan. 28, 2010

(51) Int. Cl.
*G06F 9/44*   (2006.01)
(52) U.S. Cl. ........ 717/133; 717/143; 717/149; 712/203; 712/233
(58) Field of Classification Search .......... 717/120–161; 712/203, 216, 221, 233–240; 714/37–39
See application file for complete search history.

(56) References Cited

U.S. PATENT DOCUMENTS

| 5,452,449 | A  | * | 9/1995 | Baldwin et al. ........................ 1/1 |
| 5,815,289 | A  | * | 9/1998 | Yoshida et al. ............... 358/468 |
| 7,594,222 | B2 | * | 9/2009 | Horwitz et al. ............... 717/137 |
| 7,665,070 | B2 | * | 2/2010 | Kailas ........................... 717/127 |
| 2006/0156286 | A1 | * | 7/2006 | Morgan et al. ................ 717/124 |
| 2007/0055959 | A1 | * | 3/2007 | Eckardt et al. ................ 717/126 |

FOREIGN PATENT DOCUMENTS

| JP | 10254687 A | * | 9/1998 |
| JP | 11338692   |   | 10/1999 |

OTHER PUBLICATIONS

Zitser et al., Testing Static Analysis Tools using Exploitable Buffer Overflows from Open Source Code, Oct. 31-Nov. 6, 2004, Newport Beach, CA, USA. Copyright 2004 ACM, pp. 97-106.*
Murphy et al., An Empirical Study of Static Call Graph Extractors, ACM Transactions on Software Engineering and Methodology, vol. 7, No. 2, Apr. 1998, pp. 158-191.*
Armstrong et al., Evaluating Architectural Extractors, 1998 IEEE, pp. 30-39.*
Maletic et al., Supporting Source Code Difference Analysis, 2004 IEEE, pp. 1-10.*
Whaley et al., Automatic Extraction of Object-Oriented Component Interfaces, 2002 ACM, pp. 218-228.*

* cited by examiner

*Primary Examiner* — Anna Deng
*Assistant Examiner* — Satish Rampuria
(74) *Attorney, Agent, or Firm* — Cantor Colburn LLP

(57) ABSTRACT

A method of analyzing program source code prepared for a multithreading platform comprises analyzing a targeted source code set to extract a set of characteristic information for each wait operation; analyzing the targeted source code set to extract a set of characteristic information for each notification call to an application programming interface of the multithreading platform; identifying a one-way branching correspondence with a wait operation for each notification call by comparing the extracted set of characteristic information for the notification operation and the extracted set of characteristic information for each wait operation with a set of predefined asynchronous operation correspondence pattern information for notification and wait functions implemented by the application programming interface; extracting a set of information for each identified one-way branching correspondence; and storing the extracted set of information for each identified one-way branching correspondence in a data store.

20 Claims, 5 Drawing Sheets

CALL GRAPH DEPENDENCY EXTRACTION BY STATIC SOURCE CODE ANALYSIS

BACKGROUND

Exemplary embodiments of the present invention relate to computer software development, and more particularly, to static source code analysis of software developed for multi-threading platforms.

In software development, source code refers to sequences of statements or declarations written in some human-readable computer programming language, usually a simplified form of a natural language such as English to reduce ambiguity. Source code may be written in any of hundreds of programming languages that have been developed, of which some of the most popular are C, C++, Cobol, Fortran, Java, Perl, PHP, Python, and Tcl/Tk. Source code, which allows the programmer to communicate with the computer using a reserved number of instructions, is primarily used as input to the process that produces a computer-executable program (that is, it is may be converted into a machine-language executable file by a compiler or executed on the fly from the human readable form with the aid of an interpreter).

In component-based software development, which focuses on decomposing the systems being engineered into separate functional or logical software parts (components), the source code for a particular software system will typically be contained in many text files. Each software component is an element of the system written in accordance with a specification to offer a predefined service or event that provides access to computer resources and can be incorporated with other components through its interface. An interface defines the programmatic communication boundary between two components by expressing the elements that are provided and required by each component. The types of access that interfaces provide between software components can include: constants, data types, types of procedures, exception specifications, and method signatures. In some instances, it is also useful to define variables as part of the interface.

To gain an understanding of the structure and operation of a software system, it is highly important to understand the dependencies between the components of the system and the flow of sequential processing within the system. One method for gaining such an understanding is through static analysis of the source code for the software. Static source code analysis is used by developers to check software for problems and inconsistencies before compiling the source code and executing programs built from the code for that software (analysis performed on executing programs is known as dynamic analysis). The purpose of static source analysis is to extract some information from the source or otherwise make judgments about it. Most of the high-level optimizations by a modern compiler depend on the results of static analysis such as control-flow and data-flow analysis. Outside of the compiler realm, static analysis techniques are often used in the areas of software metrics, quality assurance, program understanding, refactoring, and code visualization tools.

Unlike dynamic analysis, static code analysis can detect vulnerabilities rarely reached during the normal operation of a program. Of course, static analysis also has its limitations. In existing static analysis techniques, source codes are generally analyzed on the basis of the synchronous relationships between function calls. If the target software being analyzed includes processes developed for execution by multiple execution units such as tasks or threads, however, it is impossible using existing static analysis techniques to extract dependencies and to create a call flow that illustrates the asynchronous calling relationships such as those resulting from asynchronous system and application programming interface (API) calls.

SUMMARY

The shortcomings of the prior art can be overcome and additional advantages can be provided through exemplary embodiments of the present invention that are related to a computer-implemented method of analyzing program source code prepared for a multithreading platform. The method comprises analyzing a targeted source code set for a software entity to extract a set of characteristic information for each wait operation in the targeted source code set; analyzing the targeted source code set to extract a set of characteristic information for each notification call to an application programming interface of the multithreading platform in the targeted source code set; identifying a one-way branching correspondence with a wait operation in the targeted source code set for each notification call in the targeted source code set by comparing the extracted set of characteristic information for the notification operation and the extracted set of characteristic information for each wait operation in the target source code with a set of predefined asynchronous operation correspondence pattern information for notification and wait functions implemented by the application programming interface of the multithreading platform; extracting a set of information for each identified one-way branching correspondence; and storing the extracted set of information for each identified one-way branching correspondence in a data store.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
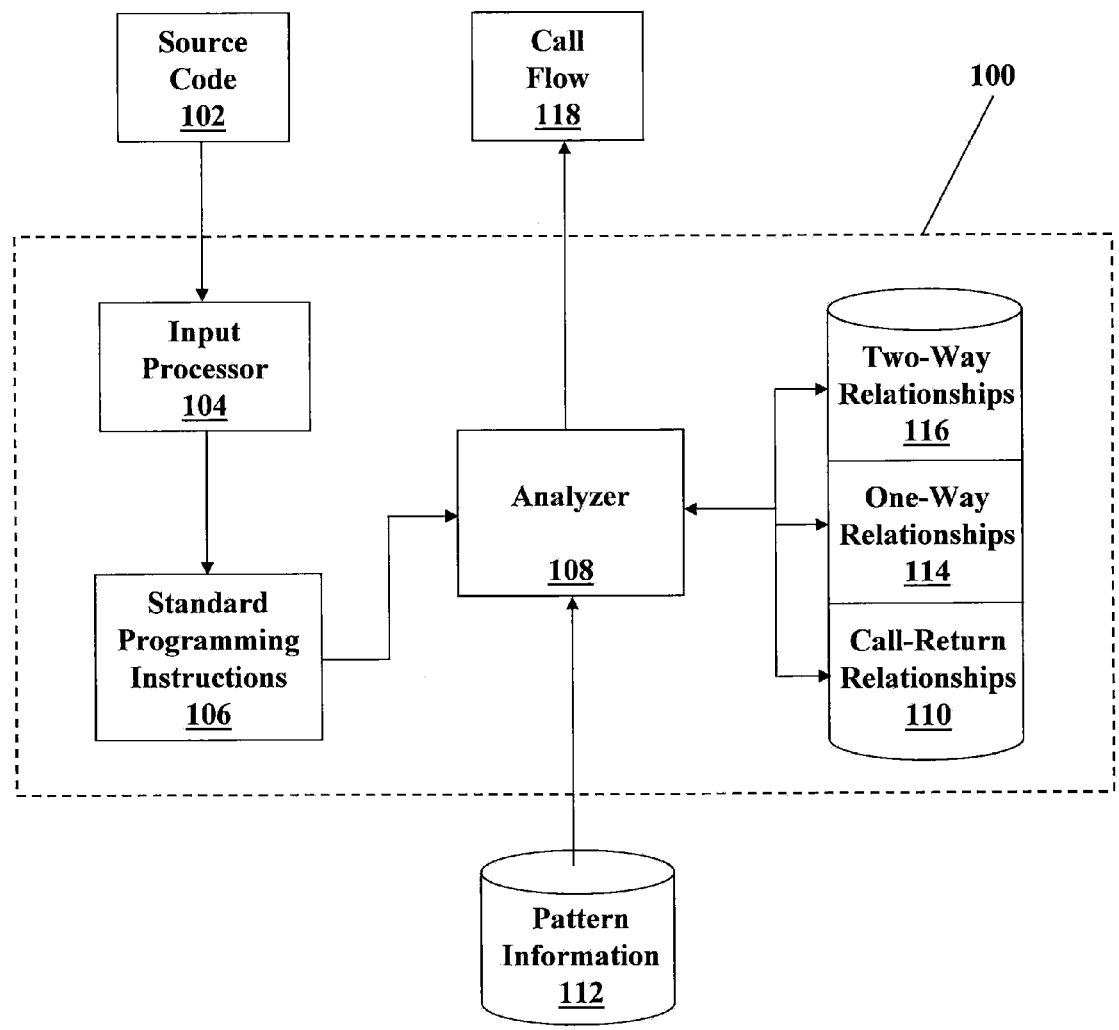
FIG. 1 is a block diagram illustrating a static source code analysis tool in accordance with an exemplary embodiment of the present invention.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Multithreading is a powerful programming technique for exploiting the inherent parallelism in contemporary computer systems. As a result, the use of concurrent multithreaded programs (that is, programs implementing an asynchronous design pattern) is pervasive. Multithreading allows multiple threads, each of which is an independent flow of execution, to exist within the context of a single process, sharing the resources of the process but able to execute independently. Threads provide a way for a program to fork (or split) itself into two or more simultaneously (or pseudo-simultaneously) running tasks, and the threaded programming model thereby provides developers with a useful abstraction of concurrent execution. Examples of multithreaded programs include numerous operating systems, databases, and innumerable embedded systems (for example, cellular telephones, consumer electronics, etc.).

An API (Application Program Interface) is a set of calling conventions for programs, code libraries, or interfaces that can used by developers to interact with a hardware device, network, operating system, software library, or application. An API is typically defined at source code level and provides a level of abstraction between the application and the kernel (or other privileged utilities) to ensure the portability of the code. Calls to the methods of an API are typically synchronous, but multithreading allows for asynchronous API calls through the use of callback functions. An asynchronous interface allows a calling thread to initiate an operation, and then continue executing without waiting on the operation to complete. That is, an asynchronous method call returns prior to the results, and then sometime later the callback function is called to return the actual results. The callback function itself contains program statements that are executed in response to the notification or reception of the results.

In current static analysis techniques, source codes are generally analyzed on the basis of relationships between function calls, and extraction of software component dependencies is based upon the synchronous call-return relationships between the functions. If the target software being analyzed is programmed to include cooperating processes that share common processing resources and that are executed by multiple execution units (such as in the case of multitasking or multithreading applications), however, it is impossible to extract inter-thread dependencies and to create an asynchronous call flow using these existing static analysis techniques. In a general inter-thread programming pattern, a call to an API requesting an asynchronous service is implemented within a first component for sending the request to a second component that is implemented to provide the service. The second component is implemented to wait until such a task is requested by another component and, upon receiving such a request, to perform the task in a separate thread of execution while also immediately returning control to the caller component, which can return to the next sequential instruction in the control flow to perform processing that does not require completion of the requested task. When the first thread of execution encounters processing that does depend on completion of the requested task, the thread will wait for notification that the requested task has completed.

The correspondence between the wait and notification operations as described above provides for efficient coordination of tasks between threads. When one thread needs to wait for another thread to complete an operation, or needs to wait until an event occurs, the thread can suspend its execution and wait to be notified when the event occurs. While such situations are similar to general function call-return relationships, current static analysis techniques cannot be employed to recognize dependencies that arise in these situations. Rather, a call flow created using current static analysis techniques will break where an asynchronous operation is initiated in a separate thread of execution and wait for the asynchronous operation to be completed. Thus, in creating a sequential call flow, current static analysis techniques cannot include the code flow executed in the separate thread.

Exemplary embodiments of the present invention can be implemented to provide a mechanism for performing static source code analysis of target multithreaded programs that operates to extract inter-thread software component dependencies and thereby enables the creation of a call flow for the program that includes the asynchronous code flows executed in separate threads of execution. More particularly, exemplary embodiments can be implemented to utilize pattern matching techniques to extract non-call-return dependencies between software components for inter-thread jump relationships (that is, control flow relationships that result from a change in the subsequent control flow that differs from the natural sequential order in which instructions are listed). These inter-thread jump relationships result from branch points when the operation requested is started asynchronously in a separate thread of execution and control returns to the caller immediately. Exemplary embodiments utilize pattern matching to discover correspondences (that is, one-way relationships) between pairs of asynchronous operations that involve multiple concurrent threads.

Referring now to FIG. 1, a block diagram illustrating a static source code analysis tool 100 in accordance with an exemplary embodiment of the present invention is provided. Static source code analysis tool 100 can include one or more program modules and data storage units. As used herein, the term "program modules" includes routines, programs, objects, components, data structures, and instructions, or instructions sets, and so forth, that perform particular tasks or implement particular abstract data types. As can be appreciated, the modules can be implemented as software, hardware, firmware and/or other suitable components that provide the described functionality, which may be loaded into memory of the machine embodying static source code analysis tool 100. Aspects of the modules may be written in a variety of programming languages, such as C, C++, Java, etc. The functionality provided by the modules shown in FIG. 1 can be combined and/or further partitioned. The modules and/or storage units can all be implemented and run on the same computing system (for example, the exemplary computer system illustrated in FIG. 6 and described below) or can be implemented and run on different computing systems. For example, one or modules can be implemented on a personal computer operated by a user while other modules can be implemented on a remote server and accessed via a network.

In exemplary embodiments, static source code analysis tool 100 can be configured for incorporation within any suitable software development environment as a plug-in, add-on, or extension supported by the server system or client systems. As used herein, the term "plug-in" can refer is a software application or module program, or one or more computer instructions, which may or may not be in communication with other software applications or modules, that interacts with a host application to provide specified functionality, and which may include any file, image, graphic, icon, audio, video, or any other attachment.

Static source code analysis tool 100 includes an input processor 104 that is configured to receive a target source code set 102 prepared by a software developer and input to the static source code analysis tool. In the present exemplary embodiment, it is are multiple flows of control), although in other exemplary embodiments, the analysis performed can be applied to single threaded systems. All control flows can be assumed to share the same global variables and a single global heap. Furthermore, all control flows execute the same code base and all possible entry points are known, which means that each thread has a top level function that it executes and that the thread dies upon return of this function. Termination of a thread can also occur due to an assertion failure, an external event, or an explicit call to the function exit. During its life, a thread can call arbitrary other functions and it can be put to sleep by voluntary actions or by external events. A thread that should never terminate can run an infinite loop in its main function.

In exemplary embodiments, input processor 104 can be configured to comments, and thereby reduce the source code to a list of standard programming instructions 106. Static source code analysis tool is then configured to submit programming instructions 106 to an analyzer 108. Analyzer 108 is implemented to instructions 106 derived by input processor 104. The execution paths may be simulated to cross multiple units, components, and files without actually being executed.

Analyzer 108 is implemented to perform an initial static analysis of component dependencies based upon the synchronous call-return relationships between the function calls in the source code. Analyzer 108 is implemented to identify these synchronous dependencies using any suitable method such as those provided by existing static source code analysis techniques. In exemplary embodiments, analyzer 108 can be implemented to identify these dependencies by analyzing a calling point for each function to associate a particular line number in a particular source code file with the function, and to analyze each referenced variable and associate a type and reference location with the variable. As is conventionally done, analyzer 108 can be implemented to extract all resolving all synchronous call-return relationships. In the present exemplary embodiment, upon performing this initial static analysis, analyzer 108 is configured to record and maintain the extracted function call information in a first data store 110. In alternative exemplary embodiments, analyzer 108 can be configured to receive the extracted function call information as input from a separate static source code analysis tool that is configured to perform the initial static analysis described above. In these exemplary embodiments, the separate static source code analysis tool can be any suitable analysis tool for deriving this synchronous call-return relationship information such as tools configured to perform conventional static analysis techniques on a target source code set.

Upon extracting the dependencies based upon the synchronous call-return relationships between the function calls in the source code, analyzer 108 is further implemented to extract correspondences between pairs of asynchronous operations that relationships between asynchronous operations or asynchronous operation branching). That is, analyzer 108 determines the inter-thread jump relationships between software components for asynchronous notification calls in the code flow where the operations requested by the notifications are initiated and executed asynchronously in a separate thread of execution while control returns to the caller component immediately. By extracting the correspondences between asynchronous operations in target source code 102, analyzer 108 can identify dependencies between the software components that involve multiple threads of execution.

In the present exemplary embodiment, analyzer 108 is implemented to utilize pattern-matching techniques to extract correspondences between asynchronous operations in target source code 102. To implement this functionality, static source code analysis tool 100 is configured to receive and store a set of predefined, platform- or system-specific asynchronous operation correspondence pattern information between notification and wait operations in a second data store 112. Static source code analysis tool 100 can obtain this information from the API specified for the particular platform for which target source code 102 is developed. The specified API may be distributed separately or as part of a software development kit, in a collection of binary libraries. Even where the source code implementation of the API is not made available, the set of asynchronous operation correspondence pattern information may be made available with the software development kit that explains the operation of the API, the proper syntax for invoking the API, arguments to be passed to the API, characteristics of values returned by the API, and other functional characteristics of the API.

In the present exemplary embodiment, each predefined pattern of asynchronous operation relationships maintained in data store 112 includes a specification of the following information regarding the notification and wait operations for the particular platform or system on which the target source code is developed to operate: (1) the names of the particular notification and wait functions (for example, set_flg( ) and wai_flg( ) in the I-TRON operating system (I-TRON is a registered trademark of I-TRON Inc. Corporation (hereinafter referred as I-TRON)) syntax, described below); (2) the operation types associated with each function name (that is, notification or wait); (3) the API specifications (that is, calling conventions) of the corresponding asynchronous operations (such as, for example, the Stdcall standard calling convention for the Microsoft Win32 API); (4) the kind and type of each shared object argument (for example, a unique ID, a pointer, a referenced structure member, etc.); (5) the ordinal designating the location of each shared object in the sequence of arguments of the API calls; (6) the kind and type of each notification content argument (for example, a unique ID, a pointer, a referenced structure member, etc.); and (7) the ordinal designating the location of each notification content in the sequence of arguments of the API call.

Analyzer 108 is implemented to reference the asynchronous operation correspondence pattern information stored in data store 112 to identify each asynchronous wait operation in target source code 102. Analyzer 108 is further implemented to configure and maintain a list of the identified wait operations in first data store 110 with reference to the extracted function call information in the first data store. The information extracted by analyzer 108 and maintained in first data store 110 for each identified wait operation in target source code 102 corresponds to the set of information maintained for wait operations in the asynchronous operation correspondence pattern information in data store 112, as described in the paragraph above.

To derive correspondences between asynchronous operations in a flow of operations involving multiple threads, analyzer is implemented to access data store 112 to perform pattern matching of relationships between pairs of notification and wait operations in the source code with reference to the predefined set of asynchronous processing pattern information in the data store. More specifically, analyzer 108 is implemented to identify the characteristics of each particular notification call in target source code 102 (which may be, for example, a signal, an event, etc.), and then uses this information to locate a wait operation from the list of wait operations recorded in first data store 110 that has characteristics corresponding to the notification operation according to a matching notification-wait pattern in the predefined patterns of relationships between notifications and waits stored in second data store 112. In the present exemplary embodiment, analyzer identifies an inter-thread notification-wait jump correspondence in a particular code flow that matches the predefined pattern from the asynchronous processing pattern information in data store 112 when the following matching conditions are satisfied between a pair of notification and wait operations in the source code and a predefined pattern of relationships between notifications and waits maintained in data store 112: (1) correspondence of operations (that is, a notification-wait correspondence between APIs of the asynchronous operations, which will include an inter-thread notification API request, and an API request to perform a wait for such notification); (2) shared object arguments of the APIs for asynchronous processing, each of which may be, for example, a global variable, a unique ID, a structure address referenced by a pointer, etc.; and (3) notification content arguments used by the APIs for asynchronous processing, each of which may be, for example, a signal, the type of an event, etc., or, alternatively, information included in the above object as its own part.

Upon identifying an inter-thread notification and wait operation pair in target source code 102 that matches the characteristics of a particular notification-wait relationship pattern stored in data store 112, analyzer 108 is configured to record the relationship as a one-way inter-thread jump in a one-way relationship history data store 114. More particularly, upon identifying a notification-wait correspondence, analyzer 108 records the identified correspondence as a relationship between asynchronous operations at which a jump occurs from a particular point in the code flow to another particular point in the code flow in one-way relationship data store 114. The information recorded for such an inter-thread jump relationship includes an identification of the particular point in the source code from which the flow jumps and the particular point in source code to which the flow jumps. Static source code analysis tool 100 is thereby implemented to detect and report each notification-wait relationship between the asynchronous operations involving multiple threads as a branching operation in the source code from the code, in addition those relationships established by the normal function calls in the code, to extract a one-way flow of operations in a code flow involving multiple concurrent tasks or threads can be extracted.

In the present exemplary embodiment, static source code analysis tool 100, upon extraction of one-way relationships between asynchronous operations in the code flow by analyzer 108 as described above, is further implemented to create a call flow for target source code 102 that includes flows executed by concurrent threads of execution. To do so, analyzer 108 is configured to detect synchronous processing patterns (that is, two-way relationships) between the asynchronous operations that involve multiple threads. More specifically, analyzer 108 is configured to identify the completion of an asynchronous operation by comparing the notification-wait relationships between the asynchronous operations recorded in one-way relationship history data store 114 with each other in view of a history of operations that a particular code flow has performed during static analysis.

In detecting the two-way relationships during static analysis, analyzer 108 sequentially traces function calls, identifies particular branching points in the code flow at which a jump occurs to another point in the code flow, and analyzes each jump to another point in the code flow in a fashion that is similar to a function call. To do so, analyzer 108 regards the point from which the jump is made as a branch point in the code flow, records the history regarding the branch point from which the jump is made in one-way relationship history data store 114, and traces the flow to which the jump is made following the branch point to identify wait operations that exist ahead in the flow. That is, the particular code fragment to which a certain thread jumps is also traced. The wait operations that are identified in the asynchronous code flow traced following each branch point are recorded along with the history for the branch point in one-way relationship history data store 114.

During the analysis of each branch point, analyzer 108 accesses one-way relationship history data store 114 to determine whether the inter-thread jump relationship for the branch point currently being analyzed includes a wait operation that corresponds to a jump relationship that has already been recorded for a code flow traced following a previous analysis of another branch point, in which case the identified wait operation corresponds to a second inter-thread jump relationship that branches back to the original thread that called the asynchronous service. This pair of inter-thread jumps represents a two-way relationship between the asynchronous operations. If analyzer 108 determines that the inter-thread jump of a branch point currently being analyzed includes a wait operation that corresponds to a prior inter-thread jump recorded in the history, the analyzer regards the branch point for the prior jump as a merge point in the code flow and deletes that particular wait operation from one-way relationship history data store 114. By repeating the above operations for each inter-thread jump performed between a pair of asynchronous operations in the code flow, two-way relationships of the asynchronous operations between multiple concurrent threads of execution can be extracted from the source code. Analyzer 108 is configured to record the relationships two-way relationship history data store 116, from which analyzer can a call flow 118 can be created, as will be described in greater detail below with reference to exemplary process 400 depicted in FIG. 4.

Figure 2:
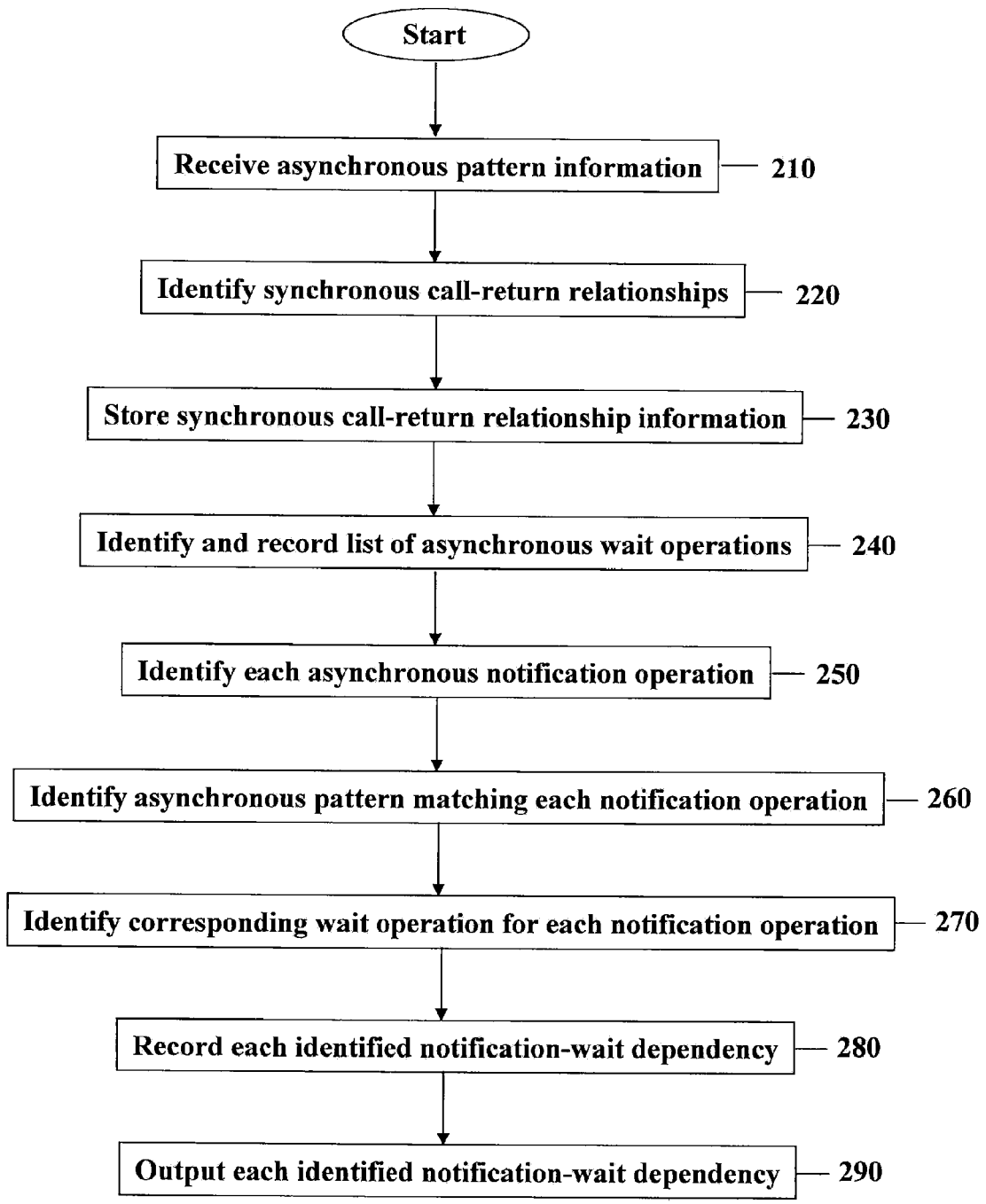
FIG. 2 is a flow diagram illustrating an exemplary embodiment of static source code analysis process for extracting one-way correspondences between asynchronous operations involving multiple threads of execution in a target source code.

Referring now to FIG. 2, an exemplary embodiment of static source code analysis process 200 for extracting correspondences between asynchronous operations involving multiple threads of execution in a target source code (that is, one-way relationships between asynchronous operations) is illustrated. Exemplary process 200 uses static analysis of the source code to determine the inter-thread jump relationships between software components for asynchronous notification calls in the code flow where the operation requested by the notifications are started asynchronously in a separate thread of execution and control returns to the caller immediately.

Figures 3A, 3B:
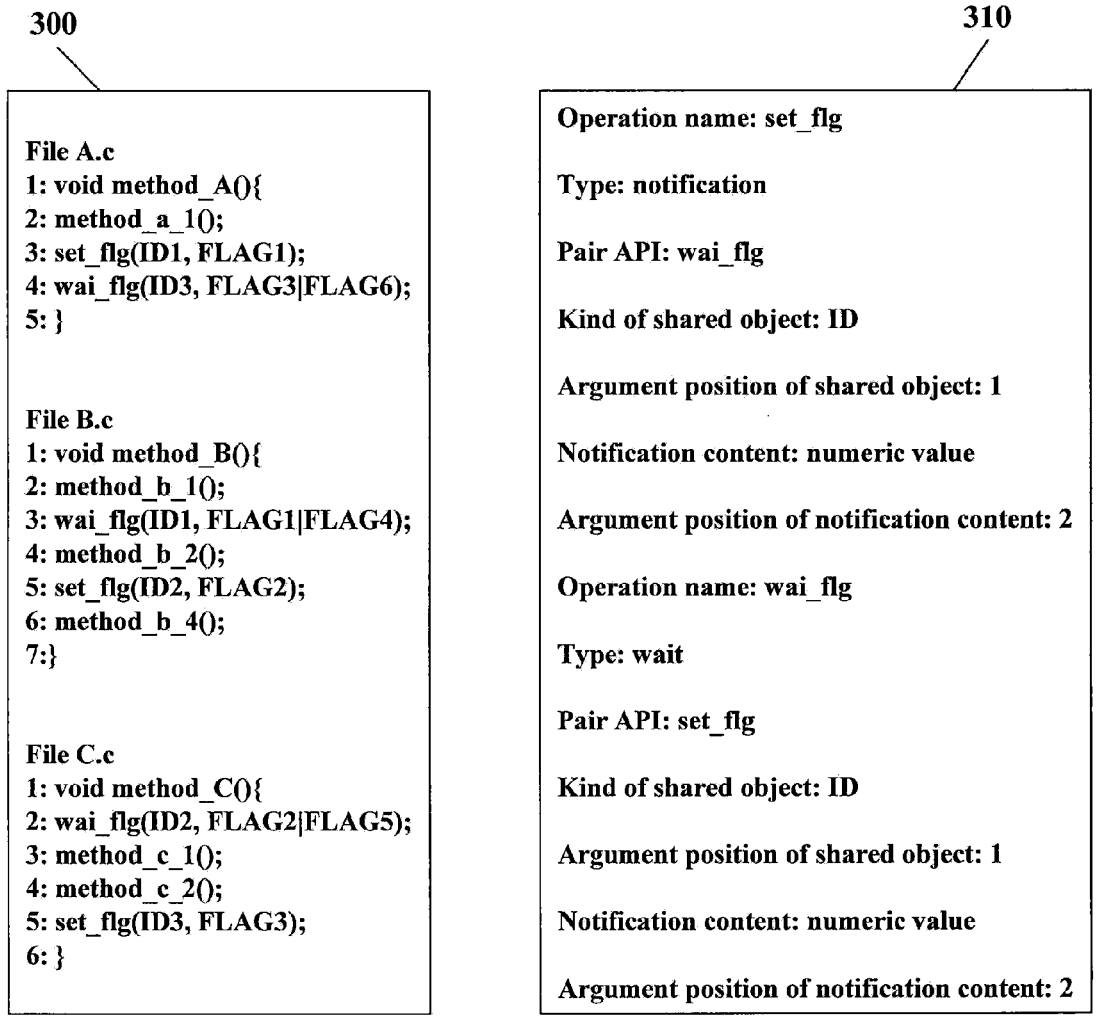
FIG. 3a illustrates a sample target source code object that can be analyzed by exemplary embodiments of the present invention.
FIG. 3b illustrates a sample asynchronous processing pattern information object that can be utilized in analysis performed by exemplary embodiments of the present invention.

The present exemplary embodiment will be described in detail by illustrating the application of the operations of process 200 to analyze the code flow of Method_A( ) in the sample target source code object 300 illustrated in FIG. 3a, which is written in accordance with the asynchronous processing pattern information 310 defined in FIG. 3b. While exemplary embodiments of the present invention can be implemented for any suitable programming language or combination of languages, development environment, and target platform or system, the specific example shown in FIGS. 3a and 3b utilizes the API set specified for the multithreaded I-TRON operating system architecture, which is a real-time kernel used for small-scale embedded systems. Static source code analysis can be especially useful in developing software for embedded systems, since it can be difficult to create a suitable environment for an analysis of such software and to partially execute such software in the special purpose hardware for which it is written.

I-TRON's task manager module provides eventflags for task synchronization that use bit correspondence flags to represent the availability of events. A task notifying other tasks of an event can set and clear certain bits of the associated eventflag. A task waiting for the event will continue to wait until certain conditions, represented by the bit pattern of the eventflag, have been met. I-TRON's task manager service "release wait state" is used to release the wait state of tasks waiting for an event, and the service "wait and release control" is used to make the current task wait for an event. The system call "wai_flg( )" waits for an eventflag specified by a particular flag ID to be set, and the system call "set_flg( )" sets the specified bits of an eventflag specified by a particular flag ID. Multiple tasks can wait at the same time for the same eventflag. Thus, a single set_flg( ) system call could result in the release of multiple waiting tasks.

Exemplary process 200 initiates, at block 210, by receiving the asynchronous processing pattern information from the API documentation for the relevant platform or system for which the target source code has been developed and storing this information on a storage medium. For the specific example provided in FIGS. 3a and 3b, asynchronous processing pattern information 310 would be stored at block 210. At block 220, an initial static analysis the target source code is performed to identify software component dependencies based upon the synchronous call-return relationships between the function calls in the source code. These synchronous dependencies can be identified using any suitable method such as those provided by existing static source code analysis techniques. At block 230, the information resulting from the analysis of the synchronous call-return relationships between the function calls performed at block 220 is stored in the storage medium. In exemplary embodiments, this information can include a calling point for each function to associate a particular line number in a particular source code file with the function, and a type and reference location for each referenced variable in the function call.

Exemplary process 200 then proceeds to extract correspondences between asynchronous operations involving multiple threads of execution in the target source code (that is, one-way relationships between asynchronous operations or asynchronous operation branching) by determining the inter-thread jump relationships between software components for asynchronous API calls in the code flow. At block 240, static analysis of the target source code is performed to identify each asynchronous wait operation in the target source code and record a list of the identified wait operations in the storage medium. The information recorded for each wait operation identified at block 240 is recorded with reference to the extracted function call information recorded at block 230 and the relevant asynchronous processing pattern information recorded at block 210. In performing exemplary process 200 to analyze target source code 300 provided in FIG. 3, all wai_flg( ) operations in the target source code are recorded in the list of wait operations at block 240. Then, at block 250, static analysis of the portion of the target source code being analyzed is performed to identify each asynchronous notification operation in the target source code. In analyzing target source code 300, each set_flg( ) operation in File A.c is identified at block 250.

In the present exemplary embodiment, at block 260, for each asynchronous notification operation identified at block 250, the asynchronous processing pattern that matches the notification operation is determined by comparing the notification with the pattern information stored at block 210. Thus, in performing exemplary process 200 to analyze target source code 300, each set_flg( ) operation identified at block 250 is determined, at block 260, to correspond to the wai_flg( ) system call. Then, at block 270, for each asynchronous notification operation identified at block 250, the characteristics of each asynchronous wait operation recorded at block 240 that matches the asynchronous processing pattern for the notification operation determined at block 260 is analyzed with reference to the characteristics of the notification operation to identify a correspondence between the notification operation and a particular matching wait operation. For example, in performing exemplary process 200 to analyze target source code 300, the set_flg( ) operation in File A.c is determined, at block 270, to correspond to the wai_flg( ) system call in File B.c. At block 280, for each corresponding pair of notification and wait operations identified at block 270, the asynchronous notification-wait dependency is recorded in the storage medium along with the synchronous call-return relationships between the function calls recorded at block 230. In performing exemplary process 200 to analyze target source code 300, the following asynchronous notification-wait dependencies are recorded at block 280: (a) File A.c:3 set_flag( )→File B.c:3 wai_flg( ); (b) File B.c:5 set_flag ( )→File C.c:2 wai_flg( ); and (c) File C.c:5 set_flag( )→File A.c:4 wai_flg( ). The target analysis performed by exemplary process 200 completes at block 290 by outputting the dependencies between the components identified at block 280.

Figure 4:
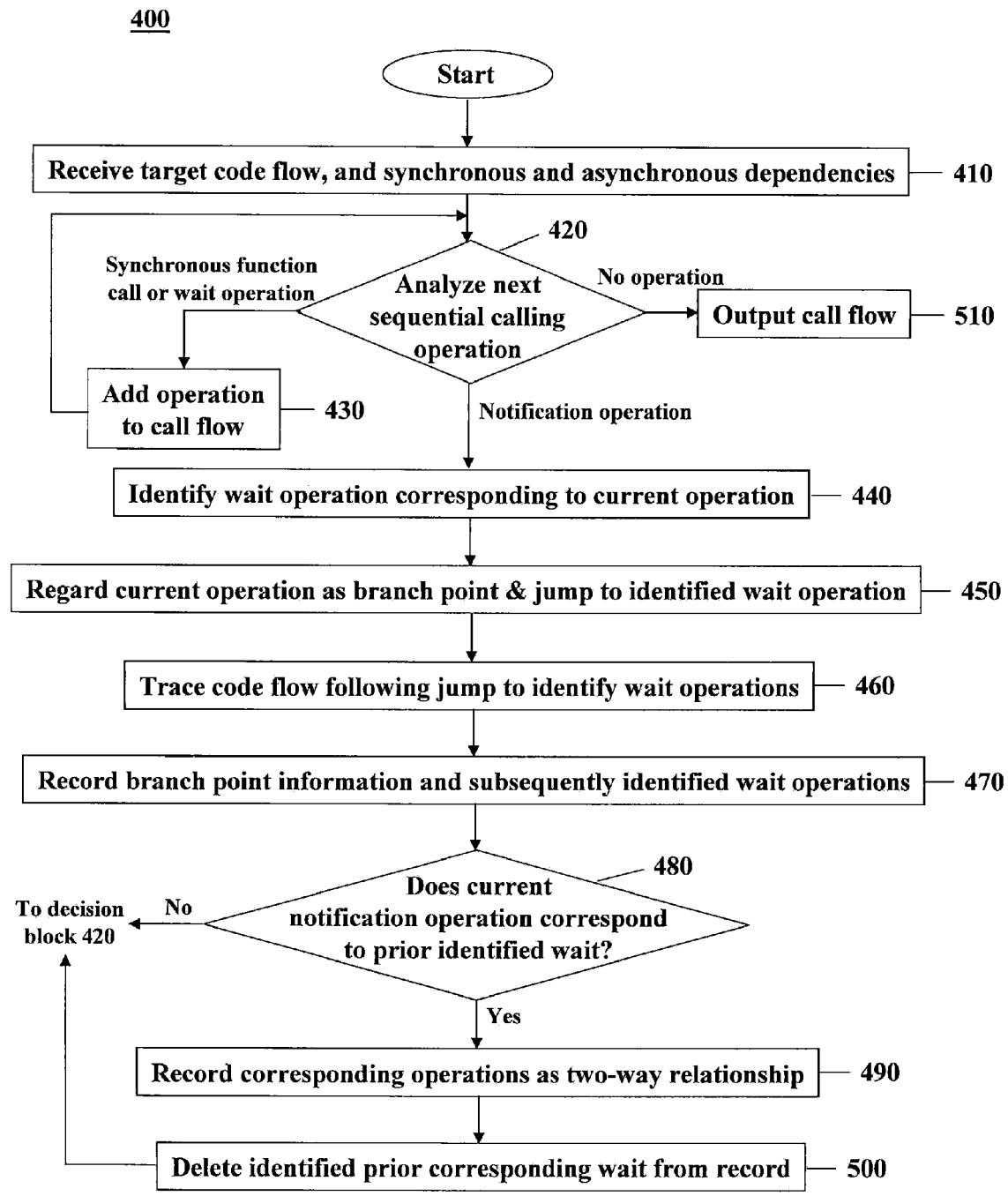
FIG. 4 is a flow diagram illustrating an exemplary embodiment of static source code analysis process for creating a call flow for a target source code by extracting two-way correspondences between asynchronous operations that involve multiple threads of execution.

Referring now to FIG. 4, an exemplary embodiment of static source code analysis process 400 for creating a call flow for a target source code by detecting synchronous processing patterns (that is, two-way relationships) between asynchronous operations that involve flows executed by concurrent threads of execution is illustrated. Exemplary process 400 uses static analysis of the source code to identify the completion of an asynchronous operation by comparing the notification-wait relationships between the asynchronous operations in a history of operations that a particular code flow has performed during static analysis. The present exemplary embodiment will be described in detail by illustrating the application of the operations of process 400 to analyze sample target source code object 300 illustrated in FIG. 3a, as written in accordance with the asynchronous processing pattern information 310 defined in FIG. 3b.

Exemplary process 400 initiates, at block 410, by receiving a target source code flow along with information regarding each asynchronous notification system call and each synchronous function call in the source code (for example, as recorded in the storage medium in blocks 230 and 270 in exemplary process 200 described above). Exemplary process then proceeds to decision block 420, where sequential analysis of the calling operations from the calling process list according to the target source code flow is initiated. In performing exemplary process 400 to analyze target source code 300, the function call method_a_1( ) and the system call set_flg( ) in method_A( ) are sequentially analyzed. More specifically, for each calling operation sequentially analyzed at decision block 420, it is determined whether the operation is a synchronous function call, a wait operation, or a notification operation.

If it is determined that a target calling operation is a synchronous function call or a wait operation at decision block 420, exemplary process 400 proceeds to block 430, at which the target operation for analysis is added to the call flow. Exemplary process 400 then returns to decision block 420 to analyze the next sequential calling operation from the calling process list according to the target source code flow.

If it is determined that a target calling operation is a notification operation at decision block 420, exemplary process 400 proceeds to block 440, at which the wait operation corresponding to the notification operation in the source code is identified. Process 400 then proceeds to block 450, at which the code flow analysis jumps to the wait operation identified at block 440 and regards the point from which the jump is made as a branch point in the code flow. For example, in performing exemplary process 400 to analyze target source code 300, where the set_flg( ) operation in File A.c is the target operation for analysis, the operation branches to the wai_flg( ) operation in File B.c (according to, for example, the result obtained by extracting dependencies between components in the source code as performed in exemplary process 200). Then, at block 460, the flow to which the jump is made at block 450 following the branch point is traced to identify wait operations that exist ahead in the flow. That is, the particular code fragment to which a certain thread jumps is also traced. At block 470, the history regarding the branch point from which the jump is made at block 450 and the wait operations that are identified at block 460 are recorded in a storage medium.

For each notification operation identified at block 420, the storage medium is accessed at decision block 480 to determine whether the inter-thread jump relationship for the branch point currently being analyzed includes a wait operation that corresponds to a jump relationship that has been recorded at block 470 for a code flow that has already been traced during a previous analysis of another branch point. If it is determined at block 480 that the inter-thread jump of the branch point currently being analyzed includes a wait operation that corresponds to a prior jump recorded in the storage medium, the jump is regarded as a merge point in the code flow, and, at block 490, the corresponding notification-wait pair of operations is recorded as a two-way pattern in the call flow. Then, at block 500, the wait operation that corresponds to a jump relationship for a code flow that has already been traced is deleted from the storage medium. Exemplary process 400 then returns to decision block 420 to analyze the next sequential calling operation from the calling process list according to the target source code flow.

Figure 5:
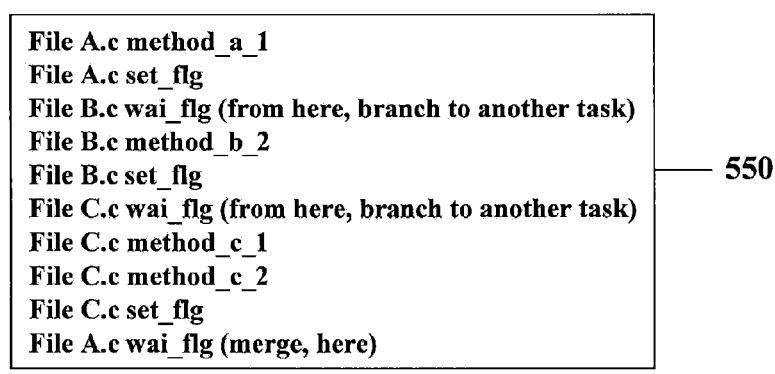
FIG. 5 illustrates a sample call flow that may result from analysis performed by exemplary embodiments of the present invention.

When no calling operations from the calling process list remain to be analyzed, the analysis performed by exemplary process 400 completes at block 510 by outputting the call flow for the target code flow. The process will complete at a point in the code flow where a target operation jumps to another task. For example, in performing exemplary process 400 to analyze target source code 300, the analysis completes when the current calling operation for analysis is the set_flg( ) operation in File C.c and the code flow has jumped to the wai_flg( ) operation in File A.c in decision block 480. As a result of performing exemplary process 400 to analyze target source code 300, the call flow 550 shown in FIG. 5 is obtained. As depicted in FIG. 5, exemplary process 400 can be implemented to obtain a call flow in which multiple code blocks are linked by asynchronous operations. In exemplary embodiments, the call flow created by exemplary process 400 can be represented using a static call graph, which is a directed graph that represents calling relationships between subroutines in a computer program. Specifically, in a call graph created using the call flow from process 400, each node represents either a function called or an asynchronous system or API call, and each edge (f,g) indicates that a component f calls component g. The call graph can then be used for human understanding of programs or as a basis for further analyses, such as an analysis that tracks the flow of values between procedures, identifies procedures that are never called, or detects other anomalies in program execution.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. As used herein, the term "program modules" includes routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of the machine embodying exemplary embodiments of a timer processing system in accordance with the present invention. Aspects of the modules may be written in a variety of programming languages, such as C, C++, Java, etc. The functionality provided by the modules described with reference to exemplary embodiments described herein can be combined and/or further partitioned.

Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 6:
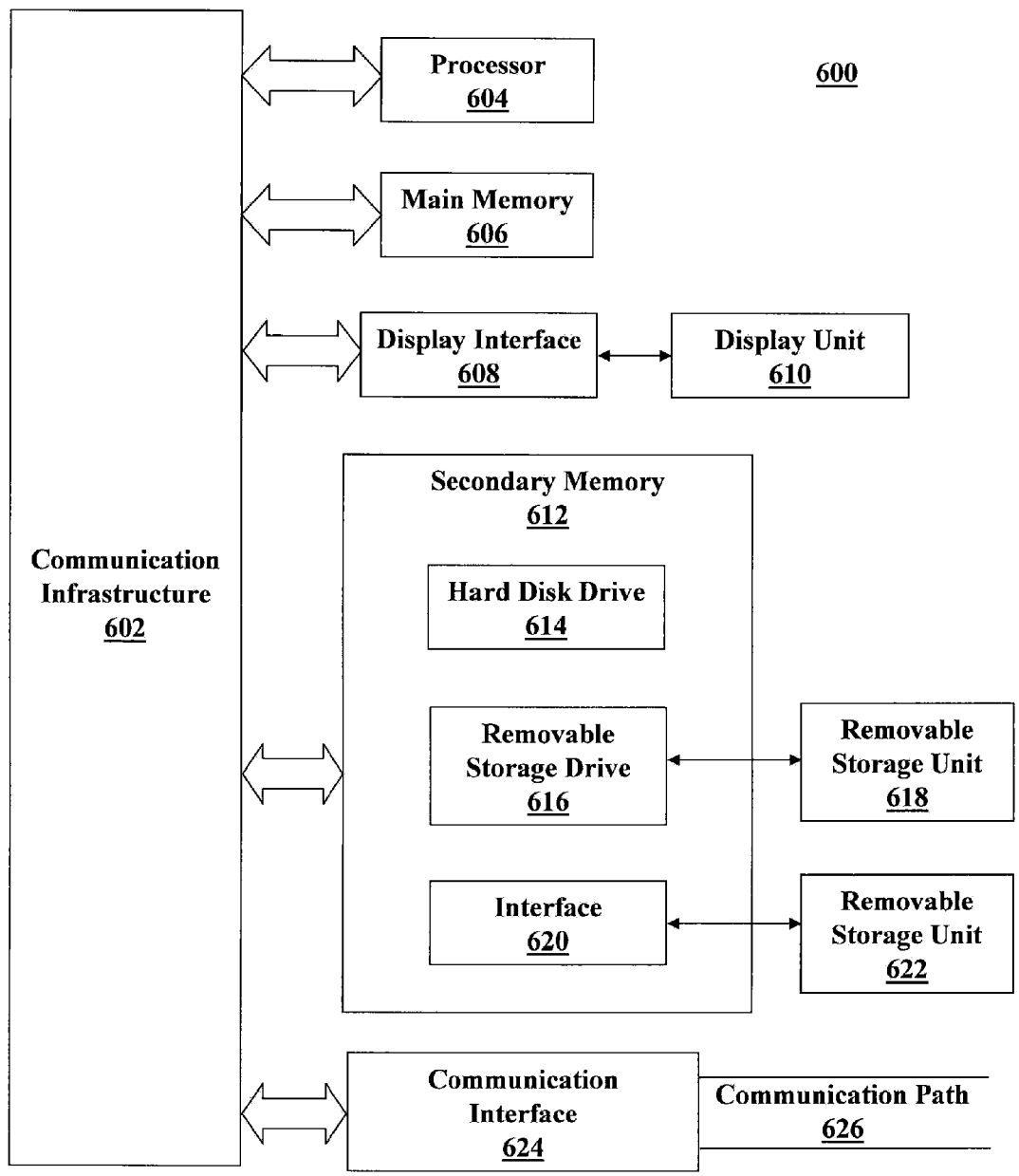
FIG. 6 is a block diagram illustrating an exemplary computer system that can be used for implementing exemplary embodiments of the present invention.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

Exemplary embodiments of computer system 600 can further include a transactional memory for sharing stored resources and mediating shared resource accesses among different requesting threads or processes. Variations on the specific architectural components of computer system 600 may include the inclusion of the transactional memory as a component of a processor or processors of the system in some instances; in alternative, the transactional memory may be a separate component on a bus connected to the processor or processors.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

What is claimed is:

1. A computer-implemented method of analyzing program source code prepared for a multithreading platform, the method comprising:

analyzing a targeted source code set for a software entity to extract a set of characteristic information for each wait operation in the targeted source code set;

analyzing the targeted source code set to extract a set of characteristic information for each notification call to an application programming interface of the multithreading platform in the targeted source code set;

identifying a one-way branching correspondence with a wait operation in the targeted source code set for each notification call in the targeted source code set by comparing the extracted set of characteristic information for the notification operation and the extracted set of characteristic information for each wait operation in the target source code with a set of predefined asynchronous operation correspondence pattern information for notification and wait functions implemented by the application programming interface of the multithreading platform;

extracting a set of information for each identified one-way branching correspondence; and storing the extracted set of information for each identified one-way branching correspondence in a data store.

2. The method of claim 1, further comprising analyzing the targeted source code set for the software entity to extract a set of call-return relationship information for each function call in the targeted source code set, and storing the extracted set of call-return relationship information for each function call in the data store.

3. The method of claim 1, further comprising receiving a set of call-return relationship information for each function call in the targeted source code set for the software entity extracted by a separate static source code analysis tool, and storing the extracted set of call-return relationship information for each function call in the data store.

4. The method of claim 2, further comprising parsing the targeted source code set to reduce the targeted source code set to a set of standard programming instructions.

5. The method of claim 2, wherein the extracted set of call-return relationship information for each function call in the targeted source code set includes a particular line number in a particular source code file of a calling point for the function call and a type and a reference location for each variable referenced by the function call.

6. The method of claim 1, further comprising obtaining the set of predefined asynchronous operation correspondence pattern information for notification and wait functions implemented by the application programming interface of the multithreading platform from a software development kit for the multithreading platform.

7. The method of claim 1, wherein the set of predefined asynchronous operation correspondence pattern information for notification and wait functions implemented by the application programming interface of the multithreading platform includes names for the notification and wait functions, an operation type corresponding to each name, calling conventions for each notification and wait function, a kind and a type for each shared object argument of each notification and wait function, an ordinal location for each shared object argument in an argument sequence of each notification and wait function, a kind and a type for notification content argument of each notification and wait function, and an ordinal location for each notification content argument in an argument sequence of each notification and wait function.

8. The method of claim 1, wherein comparing the extracted set of characteristic information for the notification call and the extracted set of characteristic information for each wait operation in the target source code with the set of predefined asynchronous operation correspondence pattern information for notification calls and wait operations implemented by the application programming interface of the multithreading platform comprises identifying a wait function pattern in the set of predefined asynchronous operation correspondence pattern information that corresponds to a notification function pattern for the notification call, and identifying a wait operation in the targeted source code set that corresponds to the notification call by comparing the extracted set of characteristic information for each wait operation with the identified wait function pattern and the extracted set of characteristic information for the notification call.

9. The method of claim 8, wherein identifying a wait operation in the targeted source code set that corresponds to the notification call by comparing the extracted set of characteristic information for each wait operation with the identified wait function pattern and the extracted set of characteristic information for the notification call comprises satisfying a set of matching conditions that include a correspondence between shared object arguments and notification content arguments of the wait operation and the notification call.

10. The method of claim 1, wherein the extracted set of information for each identified one-way branching correspondence includes the corresponding wait operation and notification call, a particular line number in a particular source code file from which a jump is made for the notification call, and a particular line number in a particular source code file to which a jump is made for the notification call.

11. The method of claim 10, further comprising tracing a target code flow path in the target source code set, and creating a call flow by sequentially analyzing each function call, wait operation, and notification call in the targeted source code set encountered while tracing the target code flow path.

12. The method of claim 11, wherein analyzing a function call or a wait operation in the targeted source code set comprises adding the function call or the wait operation to the call flow.

13. The method of claim 11, wherein analyzing a notification call in the targeted source code comprises accessing the extracted set of information for the one-way branching correspondence for the notification call to identify the particular line number in the particular source code file to which the jump is made for the notification call, tracing the target code flow path in the target source set from the particular line number in the particular source code file to which the jump is made for the notification call to identify each subsequent wait operation in the target code flow path, storing each subsequent wait operation in the target code flow path for the notification call in a second data store, and determining whether the wait operation corresponding to the notification call in the extracted set of information for the one-way branching correspondence for the notification call was stored in the second data store while analyzing an antecedent notification call in the targeted source code.

14. The method of claim 13, wherein analyzing a notification call in the targeted source code further comprises, if the wait operation corresponding to the notification call being analyzed in the extracted set of information for the one-way branching correspondence for the notification call was stored in the second data store, identifying a particular line number in a particular source code file from which a jump is made in the target code flow path for the wait operation corresponding to the notification operation and a particular line number in a particular source code file to which a jump is made in the target code flow path for the wait operation corresponding to the notification operation, and storing the extracted set of information for the one-way branching correspondence for the notification call, the particular line number in the particular source code file from which a jump is made in the target code flow path for the wait operation corresponding to the notification operation, and the particular line number in the particular source code file to which a jump is made in the target code flow path for the wait operation corresponding to the notification call in a set of information for a two-way branching correspondence between the wait operation and the notification call in the data store.

15. The method of claim 14, wherein analyzing a notification call in the targeted source code further comprises, if the wait operation corresponding to the notification call being analyzed in the extracted set of information for the one-way branching correspondence for the notification call was stored in the second data store, deleting the wait operation corresponding to the notification call being analyzed from the second data store, and adding the two-way branching correspondence between the wait operation and the notification call to the call flow.

16. The method of claim 14, further comprising creating a call graph from the call flow created by sequentially analyzing each function call, wait operation, and notification call in the targeted source code set encountered while tracing the target code flow path.

17. The method of claim 1, wherein the multithreaded platform is an embedded system.

18. The method of claim 17, wherein the embedded system utilizes the application programming interface specified for a I-TRON™ operating system.

19. A non-transitory computer-usable medium having computer readable instructions stored thereon for execution by a processor to perform a method of analyzing program source code prepared for a multithreading platform, the method comprising:
analyzing a targeted source code set for a software entity to extract a set of characteristic information for each wait operation in the targeted source code set;
analyzing the targeted source code set to extract a set of characteristic information for each notification call to an application programming interface of the multithreading platform in the targeted source code set;
identifying a one-way branching correspondence with a wait operation in the targeted source code set for each notification call in the targeted source code set by comparing the extracted set of characteristic information for the notification operation and the extracted set of characteristic information for each wait operation in the target source code with a set of predefined asynchronous operation correspondence pattern information for notification and wait functions implemented by the application programming interface of the multithreading platform;
extracting a set of information for each identified one-way branching correspondence; and
storing the extracted set of information for each identified one-way branching correspondence in a data store.

20. A data processing system comprising:
at least one processor;
a random access memory for storing data and programs for execution by the at least one processor; and
computer readable instructions stored in the random access memory for execution by the at least one processor to perform of analyzing program source code prepared for a multithreading platform, the method comprising:
analyzing a targeted source code set for a software entity to extract a set of characteristic information for each wait operation in the targeted source code set;
analyzing the targeted source code set to extract a set of characteristic information for each notification call to an application programming interface of the multithreading platform in the targeted source code set;
identifying a one-way branching correspondence with a wait operation in the targeted source code set for each notification call in the targeted source code set by comparing the extracted set of characteristic information for the notification operation and the extracted set of characteristic information for each wait operation in the target source code with a set of predefined asynchronous operation correspondence pattern information for notification and wait functions implemented by the application programming interface of the multithreading platform;

extracting a set of information for each identified one-way branching correspondence; and storing the extracted set of information for each identified one-way branching correspondence in a data store.

* * * * *